Patented July 24, 1934

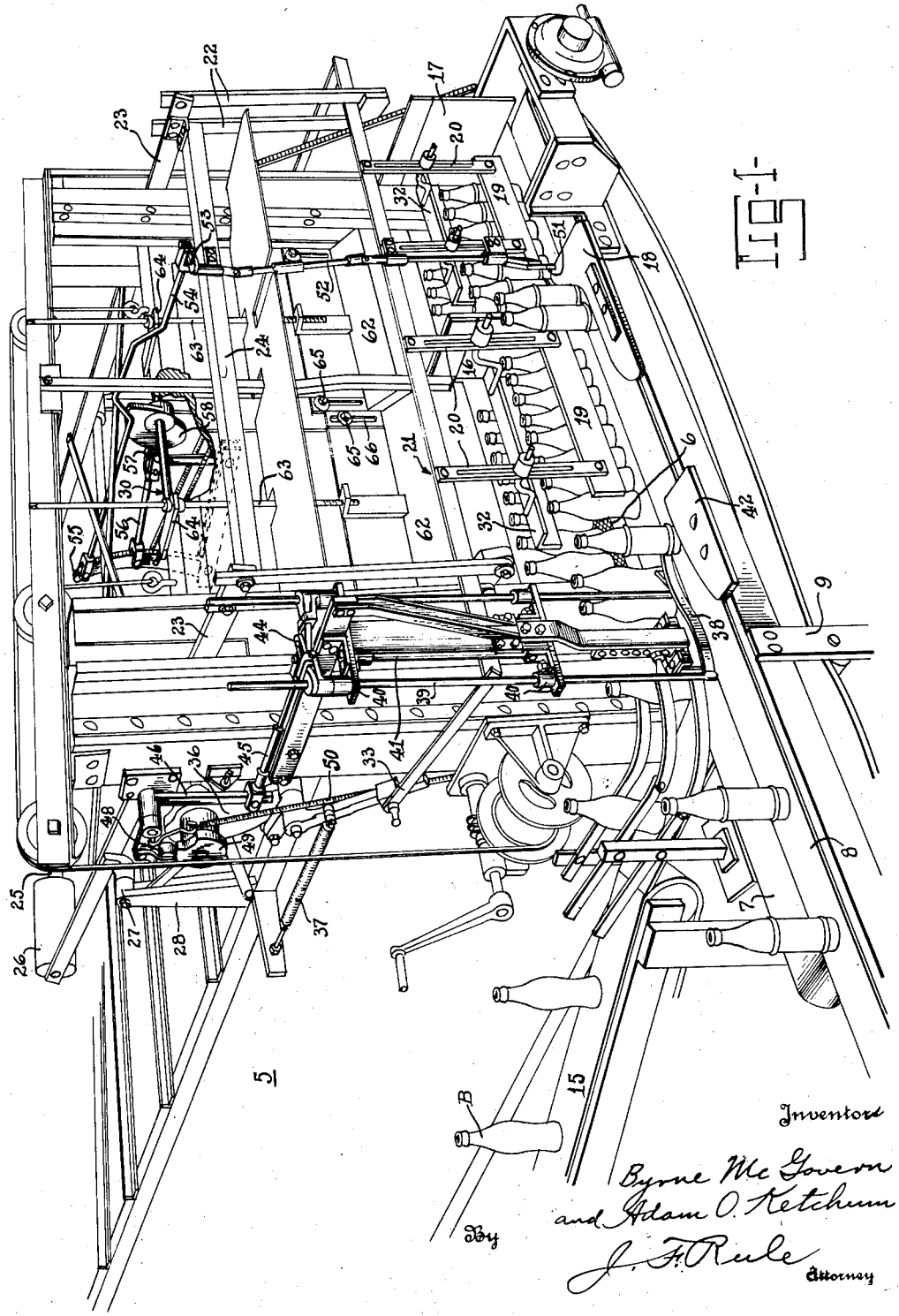

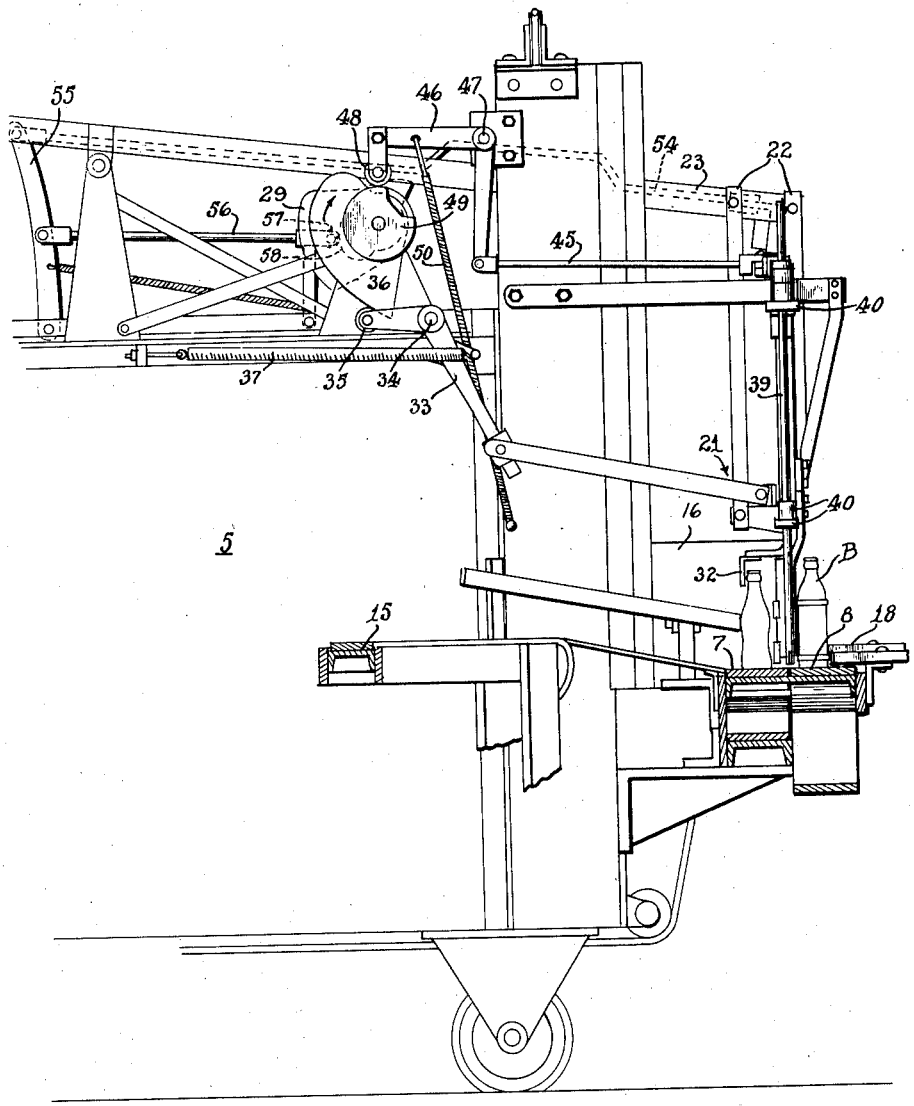

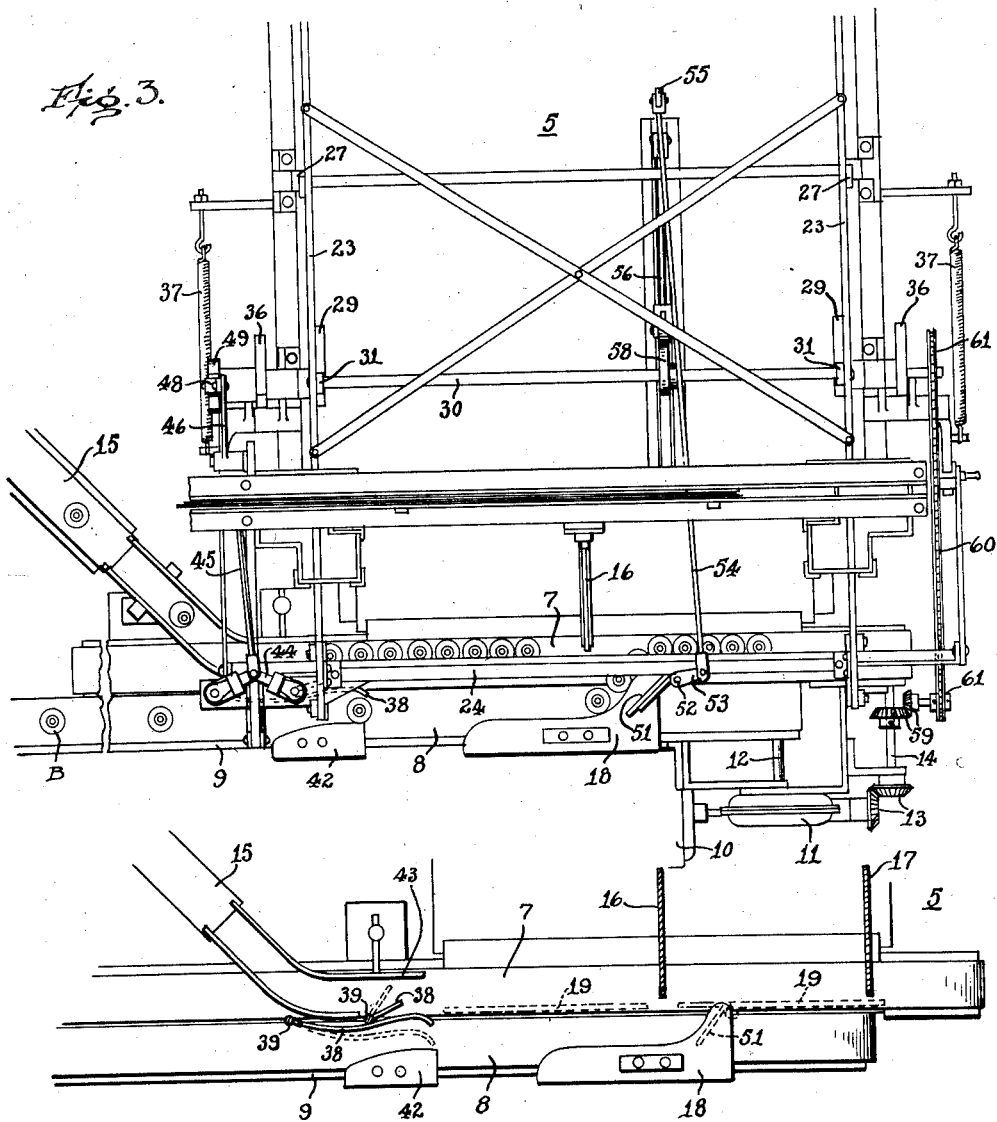

1,967,366

UNITED STATES PATENT OFFICE 1,967,366

LEER FEEDER

Byrne McGovern, Evansville, Ind., and Adam O. Ketchum, Columbus, Ohio, assignors to Owens-Illinois Glass Company, a corporation of Ohio Application May 28, 1932, Serial No. 614,142

16 Claims. (Cl. 198—31)

The present invention relates to improvements in leer feeders and more particularly to that type including a reciprocating pusher bar or bars extending across the receiving end of an annealing leer and adapted to push rows of glass articles into the leer at regular time intervals.

In commercial production of blown articles of glassware, it is frequently an advantage, and, in fact, necessary to employ a single leer in annealing several different types of articles. Ordinarily under such circumstances the operators removing the glassware from the delivery end of the leer for packing, are confronted not alone with the necessity of selecting ware for quality, but, in addition, separating the articles into groups according to the particular type or design.

An object of the present invention is the provision of means including a plurality of receiving openings for segregating the different types of glassware at the receiving end of the leer whereby each type will be caused to travel through the leer along a given individual path. In this manner the necessity for grouping the articles according to design or size is positively avoided.

Another object is the provision of automatic means for handling bottles produced on two separate machines or different kinds of bottles formed on one machine, and placing these bottles in individual zones in the leer for transportation through and annealing in the leer. To this end the leer feeder includes automatic means for directing the articles produced on one machine or one mold into one compartment of the leer tunnel and the articles produced on the second machine or another mold, into another part of said tunnel.

Other objects will be in part apparent and in part pointed out hereinafter.

In the drawings:

Fig. 1 is a perspective view illustrating a leer feeder embodying the present invention.

Fig. 2 is a fragmentary side elevational view with parts in section.

Fig. 3 is a fragmentary plan view of the complete leer feeder.

Fig. 4 is a fragmentary plan view illustrating the conveyor upon which the articles of glassware are carried to the receiving end of the leer.

The illustrated embodiment of the present invention is shown in conjunction with a conventional form of glassware annealing leer 5 including a horizontal tunnel through which articles of glassware are transported on an endless conveyor 6. The disclosed form of leer feeder is adapted to place articles of glassware produced by two forming machines or in molds of different shapes, in two separate and distinct groups within the leer tunnel. Thus packing of the articles at the delivery end of the leer is facilitated to the extent that operators need select only for quality. In more or less general terms, the feeder includes a pair of conveyor belts arranged at the receiving end of the leer and traveling along parallel paths at right angles to the direction of travel of the leer conveyor 6, said cross conveyors each carrying articles of glassware from one forming machine to a zone individual thereto in front of the leer. Reciprocating pusher bars are operated automatically at regular time intervals to transfer the groups of bottles or other articles to the leer conveyor. Suitable stops or gates are utilized in controlling the movement of articles to the transfer positions, these gates being actuated automatically and in timed relation with movements of the pusher bar.

The specific form of feeder illustrated includes a pair of horizontal inner and outer cross conveyors 7 and 8 respectively, arranged side by side and extending across the receiving end of the leer 5 in proximity to and in the same horizontal plane as the leer conveyor 6. These cross conveyors are suitably supported upon a stationary frame 9 and are driven by a motor 10 operating through speed reduction gearing 11. A shaft 12 (Fig. 3) provides driving connection between the outer cross conveyor 8 and said speed reduction gearing 11, while meshing bevel gears 13 and a shaft 14 transmit power to the inner conveyor 7. For reasons which are apparent, the outer conveyor 8 is caused to travel at a somewhat higher rate of speed than the inner conveyor 7. Obviously, this is necessary because the outer conveyor is intended to deliver a group of articles to that side of the leer remote from the machine in the same period of time that the inner conveyor 7 places a similar group of articles on the other side. A conveyor 15 (Figs. 1 and 4) is adapted to convey bottles B or similar articles from one forming machine (not shown) to one end of the inner cross conveyor 7. These articles are delivered to said cross conveyor at a constant rate of speed. A vertical partition 16 or wall, is arranged at the receiving end of the leer and in part overlies the inner conveyor serving as a stop for limiting the extent of travel of articles transversely of the leer on said inner cross conveyor 7. Thus the leer tunnel in reality has a plurality of ware receiving openings. This partition definitely divides the receiving end of the leer into two separate compartments. The outer conveyor 8 is adapted to transfer bottles or other articles from the second forming machine (not shown) to the inner conveyor at a point beyond the partition 16. A stop plate 17 (Figs. 1 and 4) extends over the inner cross conveyor near the outer end thereof and in proximity to one side wall of the leer 5. This stop plate prevents the bottles from passing beyond a position from which they may be pushed into the receiving opening of the leer. A deflector 18 is fixed to the frame 9 at a point in proximity to the partition 16, for the purpose of directing articles of glassware from the outer conveyor 8 to the inner cross conveyor 7.

At regular time intervals pusher bars 19 are operated simultaneously to transfer groups of articles from the inner cross conveyor 7 to the leer conveyor 6. These pusher bars 19 which are individual to the compartments formed by the central partition 16, are suspended on vertical arms 20 from a U-shaped frame 21 which is connected through parallel links 22 to a pair of rock arms 23. These rock arms in addition to having their outer ends connected to the links 22 and a cross bar 24 have their inner ends secured together by a bar 25, the latter carrying counterweights 26. The rock arms 23 are mounted for swinging movement in bearings 27 at the upper end of brackets 28 on the upper side of the leer 5. A pair of cams 29 (Figs. 2 and 3) fixed to a continuously rotating cam shaft 30 forwardly of the bearings 27, are adapted to rock the arms 23 at regular time intervals and thereby alternately raise and lower the pusher bars 19. These cams 29 engage rollers 31 on the rock arms 23. The U-shaped frame 21 (Fig. 1) which directly supports the pusher bars 19 and steadying bars 32 associated with said pusher bars, is connected at each end to a bell crank lever 33. Each bell crank lever is pivoted to a hinge pin 34 and carries a roller 35 engaging a continuously rotating cam 36. The cams 36 are mounted upon the opposite ends of the cam shaft 30 outwardly from and in proximity to the pusher bar lifting cams 29. Coil springs 37 constantly place the levers 33 under tension with the result that they exert a forward pressure on the pusher bars 19.

With the above construction continuous rotation of the cam shaft 30 effects at regular time intervals forward movement of the pusher bars to transfer groups of articles from the inner cross conveyor 7 to the leer conveyor 6. The completion of this forward movement is immediately followed by lifting of the pusher bars to a plane above the upper ends of the articles and then a reverse movement of said bars and lowering thereof to the starting position approximately over the dividing line between the inner and outer cross conveyors 7 and 8. In this latter position, the bars are held stationary until additional complete groups of articles are formed in rows upon the inner conveyor.

For the purpose of periodically stopping movement of bottles with the cross conveyors from positions at one side of the leer to the transfer position in front of the receiving opening, so that the pusher bars may freely and without interference transfer groups of bottles to the leer conveyor, we have provided means operating in timed relation with movement of the pusher bars for effecting such periodic stopping of the forward movement of the bottles or other articles. A pair of horizontal swinging gates 38 (Figs. 1 and 4) one for each of the cross conveyors 7 and 8, are arranged over and in proximity to the upper surface of said conveyors just outside of the line of the left vertical wall of the leer 5. These gates are fixed to the lower ends of a pair of vertical rock shafts 39 which are journaled in bearings 40 on a stationary frame 41. It will be noted that the shafts are disposed in a plane between the two cross conveyors 7 and 8 and that the gates when not operating are disposed substantially along a line between said conveyors. The gate 38, intended to swing over the outer cross conveyor 8, cooperates with a stationary block 42 in momentarily retarding the advancing movement of articles of glassware on said conveyor. The other gate cooperates with a side rail 43 in a like manner for momentarily retarding the progress of articles along the inner cross conveyor 7.

These gates are operated at regular time intervals by rocking of the shafts 39. For this purpose the upper ends of the rock shafts 39 are connected through links 44 to one end of a push rod 45. This rod is in turn connected to a bell crank lever 46 which is pivoted to a hinge pin 47 and carries a cam roll 48 riding upon a rotary cam 49. It will be observed that this cam 49 is fixed to one end of the cam shaft 30. A coil spring 50 yieldingly holds the cam roll in engagement with the cam 49 causing said roller to clearly follow the precise contour of the cam. The cams which operate the pusher bars and said gates are of such form and so relatively positioned upon the shaft 30 that just prior to forward movement of the pusher bars 19, the gates 38 are moved across their respective conveyors 7 and 8, and are so held until the pusher bars have been returned to their starting point.

It is necessary to provide a movable gate 51 on the inner end of the pusher bar 19 at the right hand side of the leer in order that a passageway may be provided permitting movement of bottles or like articles from the outer cross conveyor 8 to the inner cross conveyor 7 and at the same time provide means whereby a pusher bar of sufficient length to engage all articles or bottles of a group to be transferred, will be available. This gate 51 in effect forms an extension on the inner end of the pusher bar 19 remote from the forming machine (not shown) and is pivoted to a vertical rock shaft 52 extending upwardly from said pusher bar and connected through a bell crank lever 53 to a push rod 54, the latter extending lengthwise of the leer and pivoted to a rocker arm 55. This rocker arm 55 is connected to a push rod 56 having a cam roll 57 at one end constantly engaged with a cam 58 on the cam shaft 30. This cam is of such shape and so positioned with respect to the other cams on the shaft 30 that it closes the gate 51 during the bottle transferring operation and opens said gate during the time that the two groups of bottles or other articles are being placed in rows on the inner cross conveyor 7.

In order to simplify operation of the leer feeder as a whole, the cam shaft 30 which carries the cams controlling the various movements of the pusher bars and gates, is continuously rotated by the aforementioned motor 10 (Fig. 3), power being obtained from the shaft 14 and transmitted through meshing bevel gears 59 and a sprocket chain 60, the latter being trained over a pair of sprockets 61, one of which is fixed to one end of the cam shaft 30.

It is desirable in order to conserve heat and materially facilitate temperature control in the leer tunnel, to close the receiving end of the leer tunnel to the greatest extent permitted by the height of bottles or other articles being delivered to the leer. According to the present construction, gates 62 individual to the two compartments are provided. These gates are arranged one on each side of the partition 16 and connected to rods 63 extending vertically upward and suitably supported in brackets 64. By rotation of these rods the gates may be individually adjusted for height. Lock screws 65 extending through slots 66 in the gates and threaded into portions of the leer frame are employed to secure the gates in any adjusted position.

From the above it will be apparent that in operation (considering the leer to be handling in separate compartments or zones the articles of glassware produced on two blowing machines) the articles from one machine will be delivered to the outer cross conveyor 8 and thence to the outer end portion of the inner cross conveyor 7 while the articles from the second machine will be delivered directly to the inner cross conveyor. The central partition 16 divides the bottles into two distinct groups so that the operators at the delivery end of the leer will be confronted only with the necessity of selecting the articles according to quality for packing. Immediately after two complete rows or groups of bottles have been placed upon the inner conveyor 7 in front of the two pusher bars, the gates 38 automatically swing away from each other to retard movement of ware which normally advance to a position in front of the receiving opening. At the same time the gate 51 on one of the pusher bars is closed. Immediately the pusher bars will move forward transferring the two groups or rows of bottles to the leer conveyor 6 and will thereafter return to the starting point which is approximately on a line between the two cross conveyors. The gates 38 and 51 will open, and movement of the articles of glassware to their position in front of the pusher bars will again be effected.

While it has been brought out that the leer feeder is adapted to handle articles produced on two different machines and maintain the ware in two separate groups, it is readily conceivable that two or more different types of ware produced on a single machine might be similarly handled.

Modifications may be resorted to within the spirit and scope of the appended claims.

What we claim is:

1. A leer comprising a leer conveyor, cross conveyors arranged side by side and extending transversely and adjacent one end of the leer conveyor, means for placing articles upon the cross conveyors at one side of the leer, means for arranging the articles in groups upon the cross conveyor adjacent the leer conveyor prior to their transfer to the latter, and automatic means for transferring the articles to the leer conveyor.

2. A leer comprising a tunnel having a receiving opening at one end, a leer conveyor extending through said tunnel, cross conveyors disposed at right angles to the leer conveyor in proximity to the receiving opening, means for placing articles upon the cross conveyors at one side of the receiving opening, means causing movement of articles to the cross conveyor adjacent the leer conveyor and arranging the articles in groups on said cross conveyor prior to the transfer operation, and automatic means transferring the groups of articles to the leer conveyor.

3. A leer comprising a tunnel having a receiving opening at one end, a leer conveyor extending through said tunnel, cross conveyors disposed at right angles to the leer conveyor in proximity to the receiving opening, means for placing articles upon the cross conveyors at one side of the receiving opening, means causing movement of articles to the cross conveyor adjacent the leer conveyor and arranging the articles in groups on said cross conveyor prior to the transfer operation, automatic means for transferring the groups of articles to the leer conveyor, and automatic means for stopping movement of articles in the direction of travel of the cross conveyors during the transferring operation.

4. A leer comprising a tunnel having a receiving opening at one end, a leer conveyor extending through said tunnel, cross conveyors disposed at right angles to the leer conveyor in proximity to the receiving opening, means for placing articles upon the cross conveyors at one side of the receiving opening, means causing movement of articles to the cross conveyor adjacent the leer conveyor and arranging the articles in groups on said cross conveyor prior to the transfer operation, automatic means for transferring the groups of articles to the leer conveyor, and automatic means including gates individual to the cross conveyors for preventing movement of articles to positions in front of the receiving opening during the transfer operations.

5. In combination, a leer comprising a tunnel having a transverse series of receiving openings at one end, a leer conveyor within the tunnel, cross conveyors individual to the receiving openings arranged side by side and extending transversely of the leer in proximity to said openings, means for placing articles on the cross conveyors at one side of the leer, means for arranging the articles in groups on the cross conveyor adjacent the leer conveyor in front of the receiving openings, and means for transferring the groups of articles to the leer conveyor by way of said openings.

6. In combination, a leer comprising a tunnel having a transverse series of receiving openings at one end, a leer conveyor within the tunnel, cross conveyors individual to the receiving openings arranged side by side and extending transversely of the leer in proximity to said openings, means for placing articles on the cross conveyors at one side of the leer, means for placing the articles in separate groups on the cross conveyor adjacent the leer, said groups being individual to the cross conveyors and receiving openings, and means for transferring the groups of articles to the leer conveyor.

7. In combination, a leer comprising a tunnel having a pair of receiving openings arranged side by side at one end, a leer conveyor within said tunnel, a pair of cross conveyors arranged side by side and extending transversely of the leer in proximity to the receiving openings, means for effecting separate grouping of the articles in front of the receiving openings on the cross conveyor adjacent the leer, and means for transferring the groups of articles to the leer conveyor by way of said openings.

8. In combination, a leer comprising a tunnel having a pair of receiving openings arranged side by side at one end, a leer conveyor within said tunnel, a pair of cross conveyors arranged side by side and extending transversely of the leer in proximity to the receiving openings, means for effecting separate grouping of the articles in front of the receiving openings on the cross conveyor adjacent the leer, means for transferring the groups of articles to the leer conveyor by way of said openings, and means for stopping movement of articles to positions in front of the receiving openings during the transferring operation.

9. In combination, a leer comprising a tunnel having a pair of receiving openings arranged side by side at one end, a leer conveyor within said tunnel, a pair of cross conveyors arranged side by side and extending transversely of the leer in proximity to the receiving openings, means for effecting separate grouping of the articles in front of the receiving openings on the cross conveyor adjacent the leer, means for transferring the groups of articles to the leer conveyor by way of said openings, gates individual to the cross conveyors and mounted for movement into and out of position over the cross conveyors for periodically retarding movement of articles to the zones in front of the receiving openings, and automatic means for actuating said gates in timed relation with the article transferring operations.

10. In combination, a leer comprising a tunnel having a pair of receiving openings arranged side by side at one end, a leer conveyor within said tunnel, a pair of cross conveyors arranged side by side and extending transversely of the leer in proximity to the receiving openings, means for effecting separate grouping of the articles in front of the receiving openings on the cross conveyor adjacent the leer, means for transferring the groups of articles to the leer conveyor by way of said openings, gates individual to the cross conveyors and mounted for movement into and out of position over the cross conveyors for periodically retarding movement of articles to the zones in front of the receiving openings, and cam mechanism operating said gates in timed relation with the article transferring operations.

11. In combination, a leer comprising a tunnel having a pair of receiving openings at one end, a leer conveyor within the tunnel, a pair of cross conveyors arranged side by side and extending transversely of the leer in proximity to the receiving openings, a wall extending forwardly from the leer over the adjacent cross conveyor, said wall adapted to stop movement of articles and thereby assemble groups of bottles in front of one of the receiving openings, means for directing articles from the other cross conveyor to said cross conveyor adjacent the leer and assemble the articles in groups in front of the other receiving opening, and means for transferring said groups of articles to the leer conveyor.

12. In combination, a leer comprising a tunnel having a pair of receiving openings at one end, a leer conveyor within the tunnel, a pair of cross conveyors arranged side by side and extending transversely of the leer in proximity to the receiving openings, a wall extending forwardly from the leer over the adjacent cross conveyor, said wall adapted to stop movement of articles and thereby assemble groups of bottles in front of one of the receiving openings, means for directing articles from the other cross conveyor to said cross conveyor adjacent the leer and assemble the articles in groups in front of the other receiving opening, pusher bars individual to the openings for transferring the groups of articles to the leer conveyor, means for effecting simultaneous movement of both pusher bars, and a movable gate forming a part of one pusher bar and operable periodically to provide a passageway through which articles may be moved from one cross conveyor to the other.

13. In combination, a leer comprising a tunnel having a pair of receiving openings at one end, a leer conveyor within the tunnel, a pair of cross conveyors individual to the receiving openings arranged side by side and extending transversely of the leer in proximity to said openings, means for effecting grouping of articles in front of one of the receiving openings on the cross conveyor adjacent the leer, means for directing articles from the other cross conveyor to said cross conveyor adjacent the leer and grouping them in front of the second receiving opening, means for transferring the groups of articles to the leer conveyor, and automatic means including gates individual to and movable over said cross conveyors periodically to prevent movement of articles into zones in front of the receiving openings during the article transferring operations.

14. In combination, a leer comprising a horizontal tunnel having a pair of receiving openings arranged side by side at one end, a leer conveyor within the tunnel, a pair of cross conveyors individual to the receiving openings arranged side by side and extending transversely of the leer in proximity to said openings, means for placing articles on the cross conveyors at one side of the leer, means for directing articles from the cross conveyor remote from the leer to the other cross conveyor whereby the articles are arranged in groups in front of the receiving openings, gates movable across the cross conveyors at regular time intervals to stop travel of articles into the zones in front of said receiving openings, devices for transferring the groups of articles to the leer conveyor, and means for actuating said devices and gates in synchronism.

15. In combination, a leer comprising a horizontal tunnel having a pair of receiving openings arranged side by side at one end, a leer conveyor within the tunnel, a pair of cross conveyors individual to the receiving openings arranged side by side and extending transversely of the leer in proximity to said openings, means for placing articles on the cross conveyors at one side of the leer, means for directing articles from the cross conveyor remote from the leer to the other cross conveyor whereby the articles are arranged in groups in front of the receiving openings, gates movable across the cross conveyors at regular time intervals to stop travel of articles into the zones in front of said receiving openings, devices for transferring the groups of articles to the leer conveyor, and means including a continuously rotating cam shaft and cams rotating therewith for actuating said devices and gates in synchronism.

16. In combination, a horizontal conveyor, an inner cross conveyor and an outer cross conveyor arranged side by side at one end of said horizontal conveyor and extending in a direction at right angles to the length of the horizontal conveyor, means for placing articles upon the inner cross conveyor and causing them to accumulate in a group thereon, means for directing articles from the outer to the inner cross conveyor and causing them to accumulate in a group on the inner conveyor, automatic means for transferring said groups of articles from the cross conveyor to said horizontal conveyor, and means for continuously driving the conveyors.

BYRNE McGOVERN.
ADAM O. KETCHUM.